United States Patent Office 3,651,171
Patented Mar. 21, 1972

3,651,171
THERMOPLASTIC MOLDING COMPOSITION CONTAINING MALEIC IMIDE COPOLYMERS AND RUBBERY POLYMERS
Wulf von Bonin, Leverkusen, Horst Niermann, Cologne, and Karl-Heinz Ott, Leverkusen, Germany, assignors to Farbenfabriken Bayer Aktiengesellschaft, Leverkusen, Germany
No Drawing. Filed May 19, 1970, Ser. No. 38,881
Claims priority, application Germany, May 21, 1969, P 19 25 996.2
Int. Cl. C08g 41/04
U.S. Cl. 260—857 G 2 Claims

ABSTRACT OF THE DISCLOSURE

It is known to convert copolymers of styrene and acrylonitrile which on their own are brittle into highly impact resistant thermoplastic moulding compositions by admixing rubbers.

A thermoplastic moulding composition comprising (a) from 60 to 97% by weight of a hard maleic imide copolymers, and
(b) from 3 to 40% by weight of a rubber having a second order transition temperature below $+10°$ C.

the rubber being present in the maleic imide copolymer in finely divided form.

---

The present invention relates to a moulding composition comprising (a) from 60 to 97% by weight of a hard maleic imide copolymer, and
(b) from 3 to 40% by weight of a rubber (soft polymer) the rubber being present in finely divided form in the maleic imide copolymer. These moulding compositions may also contain additives such as lubricants, antistatic agents, dyes, fillers and stabilisers.

In the context of the present invention, rubbers (b) are polymers having a second order transition temperature according to Roelig (DIN 53 513) of less than $+10°$ C.

Apart from specific polyaddition or polycondensation polymers, for example specific polyurethanes or polyamides, suitable rubbers preferably include crosslinked or uncrosslinked polymerisation polymers. Polymers of esters of acrylic or methacrylic acid are preferably employed, for example the ethyl, butyl or isooctyl ester, polymers or copolymers of these esters with other monomers, such as styrene or acrylonitrile, or with crosslinking agents, such as divinyl benzene. It is also possible to use homopolymers of olefins, such as ethylene, propylene, isobutylene, butene, butadiene, isoprene or cyclopentene, or copolymers of such olefins, either with one another or with other monomers, for example styrene, methylstyrene, acrylonitrile, vinyl acetate, or esters of acrylic or methacrylic acid. Polymers synthesised from esters of acrylic or methacrylic acid, or primarily from butadiene, are preferably used as rubbers or soft polymers.

Graft polymers or block copolymers may also be used as rubbers (b), providing their second order transition temperature is sufficiently low.

Especially suitable rubbers are graft copolymers of (A) 80–40% by weight of polybutadiene or copolymers of butadiene and up to 50% by weight of styrene, acrylonitrile or methylmethacrylate,
(B) 20–60% by weight of grafted on monomers comprising (1) 90–65% by weight of styrene, nuclear alkylated styrene, side chain alkylated styrene, methylmethacrylate or mixtures thereof (2) 10–35% by weight of acrylonitrile, methylmethacrylate or mixtures thereof.

The rubber (b) should be present in the plastics compositions of this invention in a quantity of from 3 to 40% by weight, and preferably in a quantity of from 5 to 30% by weight.

In the present context, hard copolymers of maleic imides are copolymers of maleic imide or N-alkyl maleic imides. Copolymers of N-methyl-maleic imide are preferred although it is also possible to use other N-alkyl maleic imides, for example N-ethyl-N-butyl-, or N-cyclohexyl-maleic imide.

These copolymers are either directly prepared by copolymerising maleic imides in accordance with known methods, or, preferably, by reacting maleic anhydride copolymers with ammonia and/or primary amines accompanied by imidation, for example by heat-treating the half-amide, formed as an intermediate product, at a temperature above 100° C.

The maleic imide copolymers used in this invention preferably contain the structural units derived from maleic acid in statistical distribution. However, it is also possible to use non-statistical copolymers. The copolymers should contain at least 10 mol percent, preferably more than 20 mol percent, of units derived from the incorporated maleic imide.

They may also contain additional structural units derived from incorporated maleic anhydride. Such units will be present when maleic anhydride is used as a comonomer in preparing the hard polymers by direct copolymerisation of the monomers, or when a stoichiometric excess of an amine is used in the preferred reaction of a maleic anhydride copolymer with a primary amine to form the corresponding imide. If imidation is not complete, a minor proportion of half amide units may of course also be present in the hard maleic imide copolymer.

The molar ratio of imide to anhydride units in the hard polymer should be at least 0.5 and preferably more than 1.00, i.e. in the hard maleic imide copolymer produced by imidation of a maleic anhydride copolymer, at least about 30%, and preferably more than 50%, of the anhydride units should be converted into imide units.

In addition to structural units derived from incorporated maleic imide or maleic anhydride, the hard maleic imide copolymers also contain units derived from incorporated comonomers. Suitable comonomers include unsaturated hydrocarbons, such as isobutylene, ethylene, 2-methyl-1-pentene, styrene, methyl-styrene, diisobutylene and indene, which monomers polymerise substantially statistically with maleic anhydride. Isobutylene and ethylene are preferred.

Preferred hard copolymers of maleic imides include copolymers of ethylene or isobutylene with maleic imide and/or N-methyl maleic imide in which less than 100 mol percent of maleic anhydride are additionally copolymerised, based on the total of maleic imide and/or N-alkyl maleic imide.

The hard copolymers of maleic imides (a) are intended to be present in the plastics compositions according to the invention in quantities of from 97 to 60% by weight, and preferably in quantities of from 95 to 70% by weight.

The plastics compositions may contain additives such as lubricants, antistatic agents, dyes and fillers or stabilisers. The soft polymer (b) is intended to be present in the hard maleic imide copolymer in finely divided form. The particle size of a fine division or distribution as referred to in this context is microscopic or even submicroscopic.

Such a fine distribution of the soft polymer in the hard polymer can be achieved in various ways, for example by kneading both components together in a heatable kneading or mixing machine, a roll stand or in a mixing extruder. Alternatively a solution or latex of the soft polymer is mixed with the optionally powdered hard polymer, the solvent is removed and the resulting solids mixture is dried. Similarly, both components can be mixed in dissolved form and subsequently precipitated for example as a solution in dimethyl formamide, followed by solvent removal and kneading of the solids mixture.

Another method of obtaining the required fine distribution is directly to prepare one of the polymeric components in the presence of the other with mixing. The powdered hard component is preferably made into a paste with an acrylate or methacrylate and optionally other monomers, and activators, and the monomers are polymerised to form the soft polymer (b) on passing through a reaction extruder with an evaporator for residual monomers.

It is also possible to use solutions or suspensions of half amide ammonium salts of the corresponding maleic anhydride copolymers, for example, in water, as an intermediate stage for the production of the hard maleic imide copolymer (a), to introduce the soft polymer (b) into the solutions into the form of beads, granulates or preferably latices, to evaporate water in suitable extruders and drying machines, and to complete imide formation from the half amide ammonium salts (half amide intermediate stage) of the maleic anhydride copolymers by increasing the temperature to more than 100° C. and preferably to more than 150° C., with mixing, to form a granulate of the polymer combination.

In addition, it is also possible in some instances to use a solution or suspension of a half amide ammonium salt (half amide intermediate stage) of the corresponding maleic anhydride copolymer, for example in water, as reaction medium for the preparation of the soft polymer (especially when a polyacrylate is involved), by carrying out an emulsion or even bead polymerisation reaction which leads directly to the formation of the soft polymer component in the solution or suspension. The entire plymer mass is then dried under mixing conditions and converted into the imide.

The hardness and high heat stability of maleic imide copolymers remains substantially unchanged in the moulding compositions according to the invention. At the same time, however, toughness and processibility is considerably improved.

The plastics compositions according to the invention, which can be obtained by various mixing methods as exemplified above are most readily processed in granulate form. Rods made by injection moulding or panels obtained by pressing are usually opaque to milky and show improved impact strength, with outstanding hardness and resistance to high temperature.

The plastics combinations according to the invention are preferably used as thermoplastic moulding masses. They can be processed on conventional machines, optionally at elevated temperatures, for example by extrusion, injection moulding, deep drawing, calendering, moulding, or sintering. They can be converted into filaments, or foamed, dyed, lacquered and metallised. They may be used in the production of consumer goods or structural elements, for example in the domestic appliance or electrical industry.

Production and properties of hard maleic imide polymers are described below. In the following examples, these polymers are applied either in the water-soluble half-amide-methyl ammonium salt intermediate stage and then imidated in the presence of the soft polymer component with mixing, or alternatively as imides proper.

The hard maleic imide polymers are characterised by their notched impact strength, measured in accordance with DIN 53,453, their Vicat temperature, measured in accordance with DIN 53,460, and also by their ball indentation hardness measured in accordance with DIN 53,456, indicative respectively of their impact resistance under unfavorable conditions, of their heat resistance and of their mechanical hardness.

The values thus determined should be compared with the corresponding values of the compositions according to the invention contained in the examples. Such comparison demonstrates that notched impact strentgh is generally improved by 100% and more, whereas thermal solubility remains substantially unaffected. Hardness decreases to some limited extent. This, however, does not impede their usefulness.

In the following preparations, and in the succeeding examples, all parts and percentages are by weight, unless otherwise indicated.

Polymer A

An equimolar isobutylene-maleic anhydride copolymer with a substantially alternating structure and a $\eta$-value of 2.2 (measured in dimethyl formamide (DMF) at 25° C.) is suspended in finely divided form in benzene, and 50 mol percent of methylamine gas (based on anhydride groups) are added to the resulting suspension. The suspension is then stirred for 10 hours at 80° C., and filtered, and the half amide which is formed is dried. It is then heat-treated for 10 hours at 170° C. in a water-jet vacuum. Analysis shows that the polymer in imidated form now comprises 50 mol percent of isobutylene units, 27.5 mol percent of maleic anhydride units and 22.5 mol percent of N-methyl maleic imide units.

Polymer B

An equimolar isobutylene-maleic anhydride copolymer with a value of 1.6 (measured in DMF at 25° C.) is suspended in benzene. Approximately 78 mol percent of methylamine (based on anhydride units) is then slowly introduced under pressure, the mixture is heated for 10 hours at 85° C. the resulting half amide is dried and then subjected to imidation for 8 hours in vacuo at a temperature of 170° C. Analysis shows that the final polymer comprises 50 mol percent of isobutylene units, 12.5 mol percent maleic anhydride units and 27.5 mol percent of N-methyl maleic imide units.

Polymer C

An equimolar isobutylene-maleic anhydride copolymer with a value of 2.4 (measured in DMF at 25° F.) is suspended in benzene. Approximately 100 mol percent of methylamine gas, based on anhydride units, is then introduced under pressure, and the mixture is heated for 5 hours at 110° C., and cooled; the resulting half amide is dried and then subjected to imidation in a nitrogen atmosphere at a temperature of 175° C. The final polymer comprises 50 mol percent of isobutylene units, 2.5 mol percent of maleic anhydride units and 47.5 mol percent of N-methyl maleic imide units.

Polymer D

An equimolar copolymer of maleic anhydride and isobutylene with an $\eta$-value of 2.1 (measured in DMF at 25° C.) is dissolved in excess aqueous methylamine solution to form an approximately 10% solution of the methylammonium salt of the half amide. Excess methylamine is removed by heating at 60° C.

This solution can now be further processed for purposes in which the half amide intermediate stage is to be mixed in aqueous solution with the soft polymer component before imidation. To recover the pure hard maleic imide polymer, the aqueous solution of the half amide is passed through a reaction screw with an evaporation attachment at a temperautre of from 200 to 300° C. with a residence time of less than 3 minutes in the high temperature section, as a result of which the polymer can be obtained in granulate form. It is also possible to concentrate the half amide solution through evaporation in a spray dryer and then to subject the powder to imidation in vacuo at a temperature of 170° C. The polymer comprises 50 mol percent of isobutylene units and 50 mol percent of N-methyl maleic imide units.

Polymer E

An alternating isobutylene-maleic anhydride copolymer with an $\eta$-value of 2.1 (measured in DMF at 25° C.) is suspended in toluene. 40 mol percent of methylamine, based on anhydride units, is then introduced under pressure, followed by 30 mol percent of ammonia, the mixture is stirred for 10 hours at 110° C., dried and subjected to imidation at 170° C. The imide polymer formed comprises 50 mol percent of isobutylene units, 20 mol percent of N-methyl maleic imide units, 15 mol percent of maleic imide units and 15 mol percent of maleic anhydride units.

Polymer F 65 mol percent of ethylamine, based on anhydride units, are added to the isobutylene-maleic anhydride copolymer used for polymer E in solution in benzene, and the product is stirred for 5 hours at 90° C. It is then suction-filtered, dried and subjected to imidation in vacuo at a temperature of 170° C. The imidated polymer contains 50 mol percent of isobutylene units, 32.5 mol percent of N-ethylmaletic imide units and 17.5 mol percent of anhydride units.

Polymer G

As in the case of polymer B, an alternating ethylene-maleic anhydride copolymer with an $\eta$-value of 0.95 (measured in DMF at 25° C.) is converted into an imide polymer comprising 50 mol percent of ethylene units, 35 mol percent of N-methylmaleic imide units and 15 mol percent of maleic anhydride units.

Polymer H

As in the case of polymer G, an imide polymer is prepared comprising 50 mol percent of ethylene units 22.5 mol percent of N-methylmaleic imide units and 27.5 mol percent of maleic anhydride units.

Polymer J

The alternating ethylene-maleic anhydride copolymer used for polymer G is dissolved in excess aqueous ammonia, the solution is concentrated by evaporation and the half amide thus obtained is subjetced to imidation in vacuo at a temperature of 180° C. Analysis shows that the polymer comprises 50 mol percent of ethylene units, 41 mol percent of maleic imide units and 9 mol percent of maleic anhydride units.

Polymer K

As in the case of polymer D, an imidated polymer is prepared which comprises 50 mol percent of ethylene units and 50 mol percent of N-methylmaleic imide units.

The figures set out in the following table were derived from tests on mouldings obtained by moulding at 270° C. for 10 minutes.

| Polymer: | Notched impact strength. kp./cm.² | Vicat temperature. ° C. | Ball indentation hardness. kp./cm.² |
| --- | --- | --- | --- |
| A | 2.5 | 167 | 2,500 |
| B | 3.0 | 159 | 2,400 |
| C | 3.5 | 151 | 2,380 |
| D | 3.9 | 148 | 1,900 |
| E | 1.8 | 147 | 2,420 |
| F | 3.5 | 146 | 1,720 |
| G | 1.9 | 128 | 1,140 |
| H | 1.5 | 134 | 1,250 |
| J | 1.6 | 184 | 1,100 |
| K | 2.1 | 120 | 1,080 |

The figures quoted in the following examples were obtained in the same way as the figures relating to the polymers described above.

EXAMPLE 1

100 parts of a 30% latex of a copolymer of 35% by weight of acrylonitrile and 65% by weight of butadiene are stirred into 1000 parts of a 10% aqueous half amide ammonium salt solution according to the description for polymer D. The mixture is then dried in a spray dryer to form a fine powder which is then heat treated in vacuo for 5 hours at 170° C., as a result of which the imide polymer as shown by the appearance of the characteristic imide double band in the infra-red spectrum. The polymer mass formed is rolled and molded into test specimens: notched impact strength 6.9 kp./cm.², Vicat temperature 138° C., ball indentation hardness 1090 kp./cm.².

EXAMPLE 2

The procedure is as in Example 1, except that 100 parts of a 30% latex whose polymer is a crosslinked copolymer of 2.5 parts of methylene bis-acrylamide and 97.5 parts of butyl acrylate, are stirred into the solution of the half amide. Imidation and working up are carried out as in Example 1. Notched impact strength 9.8 kp./cm.², Vicat temperature 149° C., ball indentation hardness 1212 kp./cm.².

EXAMPLE 3

50 parts of the latex used in Example 1 are added with quick stirring to 1000 parts of a 10% solution of polymer A in dimethyl formamide. The mixture is then precipitated by pouring it into cold methanol, and the resulting precipitate is washed with methanol and dried. The solids product is rolled and moulded into test specimens: Notched impact strength 6.7 kp./cm.², Vicat temperature 151° C., ball indention hardness 1380 kp./cm.².

EXAMPLE 4

100 parts of a 30% latex of a graft polymer of 35 parts of styrene and 15 parts of acyrlonitrile on 50 parts of polybutadiene are stirred with a turbo mixer into 1000 parts of a 10% solution of polymer C in dimethyl formamide. The mixture is then dried in vacuo, rolled and moulded into test specimens:

Notched impact strength 13.9 kp./cm.², Vicat temperature 138° C., ball indentation hardness 1080 kp./cm.².

EXAMPLE 5

90 parts of powdered D are made into a paste with 100 parts of the graft polymer latex used in Example 4, which had been previously diluted with water to a solids content of 10%. The mixture is thoroughly dried, homogenised for 3 minutes at 240° C. in a nitrogen-flushed kneading machine and then moulding into test specimens:

Notched impact strength 8.7 kp./cm.²., Vicat temperature 138° C., ball indentation hardness 1310 kp./cm.².

EXAMPLE 6

90 parts of powdered polymer D and 10 parts of a size-reduced graft polymer of 35 parts of styrene and 15 parts of acrylonitrile on 50 parts of polybutadiene are mixed on rollers at 220° C. and then moulded into test specimens:

Notched impact strength 6.8 kp./cm.², Vicat temperature 144° C., ball indentation hardness 1250 kp./cm.².

EXAMPLE 7

The procedure is as in Example 6, except that 70 parts of polymer D are mixed with 30 parts of the graft polymer:

Notched impact strength 12.9 kp./cm.², Vicat temperature 134° C., ball indentation hardness 1050 kp./cm.².

EXAMPLE 8

20 parts of the graft polymer used in Example 6 are stirred into 800 parts of a 10% solution of polymer E in dimethyl formamide, resulting in the formation of a swollen pasty mass. This mass is passed through an evaporation screw operating at 280° C. in a water-jet vacuum, the solvent being removed under mixing conditions. The end product is obtained in the form of strands, which are broken up and moulded into test specimens:

Notched impact strength 9.1 kp./cm.$^2$, Vicat temperature 141° C., ball indentation hardness 1105 kp./cm.$^2$.

EXAMPLE 9

20 parts of the finely powdered graft polymer used in Example 6 are dispersed in 800 parts of the aqueous solution of the half amide used in Example 1. The paste formed is dried, homogenised under nitrogen at 240° C. in a kneader, and then moulded into test specimens:

Notched impact strength 8.5 kp./cm.$^2$, Vicat temperature 148° C., ball indentation hardness 1180 kp./cm.$^2$.

EXAMPLE 10

15 parts of the graft polymer used in Example 6 are stirred into 850 parts of a 10% solution of polymer K in dimethyl formamide. The product is worked up as in Example 8:

Notched impact strength 7.2 kp./cm.$^2$, Vicat temperature 112° C., ball indentation hardness 910 kp./cm.$^2$.

EXAMPLE 11

85 parts of polymer A are kneaded with 15 parts of an EPT rubber (55% of ethylene, 45% of propylene, 5% of ethinylnorbornene) in a high speed screw kneader at a temperature of 260° C. The homogenised mass is then moulded into test specimens:

Notched impact strength 5.1 kp./cm.$^2$, Vicat temperature 141° C., ball indentation hardness 1030 kp./cm.$^2$.

EXAMPLE 12

85 parts of polymer B are kneaded with 15 parts of an emulsion copolymer of 33% of styrene and 67% of butadiene as in Example 11, followed by moulding into test specimens:

Notched impact strength 5.4 kp./cm.$^2$, Vicat temperature 146° C., ball indentation hardness 1100 kp./cm.$^2$.

EXAMPLES 13–17

In the following examples, 80 parts of each of the starting polymers listed in the following table are kneaded at 260° C. in a high speed kneader with 20 parts of a copolymer of 10 parts of styrene, 40 parts of ethyl acrylate, 35 parts of butyl acrylate and 15 parts of methyl methacrylate. The product is then moulded into test specimens. The following values were measured.

| Example No.: | Polymer | Notched impact strength, kp./cm.$^2$ | Vicat temperature, °C. | Ball indentation hardness, kp./cm.$^2$ |
|---|---|---|---|---|
| 13 | E | 7.2 | 131 | 1,220 |
| 14 | F | 8.1 | 117 | 930 |
| 15 | G | 6.3 | 121 | 890 |
| 16 | H | 6.5 | 122 | 900 |
| 17 | J | 7.9 | 134 | 920 |

EXAMPLE 18

An equimolar copolymer of maleic anhydride and isobutylene, η-value 2.05 (as measured in DMF at 25° C.) is dissolved to form a 9% solution in excess aqueous methylamine solution. Excess methylamine is then distilled off in a water-jet vacuum and the resulting half amide ammonium salt solution is concentrated as a result to a solids content of 10%. 30 parts of butyl acrylate, 0.75 part of ammonium persulphate, and 0.5 part of triethanolamine are then stirred into 700 parts of this solution in a nitrogen atmosphere. Polymerisation is then carried out at a temperature of 45° C., giving a polybutyl acrylate latex in the aqueous solution of the half amide ammonium salt.

The latex is then dried in a spray dryer and the powder which is obtained is heated in vacuo for 5 hours at 170° C. As a result, the half amide is converted into the corresponding imide. The polymer mass thus prepared is then rolled and moulded into test specimens.

Notched impact strength 6.9 kp./cm.$^2$, Vicat temperature 139° C., ball indentation hardness 970 kp./cm.$^2$.

EXAMPLE 19

80 parts of polymer C are kneaded at 270° C. in a nitrogen flushed kneader with 20 parts of a copolymer of 55 parts of ethylene and 45 parts of vinyl acetate. The product is then moulded into test specimens:

Notched impact strength 7.1 kp./cm.$^2$, Vicat temperature 132° C., ball indentation hardness 1030 kp./cm.$^2$.

We claim:

1. A thermoplastic moulding composition comprising (a) 60 to 97% by weight of a hard maleic imide addition copolymer containing at least 10 mol percent of incorporated maleic imide and (b) 3 to 40% by weight of a rubber having a second order transition temperature below 10° C. and selected from the group consisting of olefin polymers, acrylic and methacrylic acid ester polymers wherein the ester component is free of moieties reactive with the maleic imide copolymer and graft copolymers based on butadiene.

2. The moulding composition of claim 1 wherein the comonomer of said maleic anhydride copolymer is isobutylene, ethylene, 2-methyl-1-pentene, styrene, methylstyrene, dibutylene or indene.

References Cited

UNITED STATES PATENTS

| 3,429,947 | 2/1969 | Van Eygen | 260—836 |
| 3,334,075 | 8/1967 | Kehn | 260—78 UA |
| 3,506,624 | 4/1970 | Behrens | 260—78 UA |
| 3,386,956 | 6/1968 | Van Eygen | 260—78 UA |

PAUL LIEBERMAN, Primary Examiner

U.S. Cl. X.R.

260—78 UA, 857 U, 857 L